US009912584B2

(12) United States Patent
Maino et al.

(10) Patent No.: US 9,912,584 B2
(45) Date of Patent: Mar. 6, 2018

(54) DATA CENTER INBOUND ROUTING OPTIMIZATION IN THE EVENT OF VIRTUAL MACHINE MOBILITY

(71) Applicant: Cisco Technology, Inc., San Jose, CA (US)

(72) Inventors: Fabio Maino, Palo Alto, CA (US); Victor Moreno, Carlsbad, CA (US); Satyam Sinha, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 223 days.

(21) Appl. No.: 14/536,381

(22) Filed: Nov. 7, 2014

(65) Prior Publication Data

US 2016/0134526 A1    May 12, 2016

(51) Int. Cl.
G06F 9/455    (2006.01)
G06F 15/16    (2006.01)
(Continued)

(52) U.S. Cl.
CPC ........ *H04L 45/505* (2013.01); *G06F 9/45558* (2013.01); *G06F 9/5077* (2013.01); *G06F 21/53* (2013.01); *H04L 12/4641* (2013.01); *H04L 45/586* (2013.01); *H04L 45/64* (2013.01); *H04L 45/66* (2013.01); *H04L 67/1002* (2013.01); *H04L 67/28* (2013.01);
(Continued)

(58) Field of Classification Search
CPC ... H04L 45/505; H04L 67/1002; H04L 45/66; H04L 12/4641; H04L 67/28; H04L 45/586; H04L 45/64; H04L 49/70; G06F 9/45558; G06F 21/53; G06F 9/5077; G06F 2009/45595; G06F 2009/4557

USPC ........................................................... 718/1
See application file for complete search history.

(56) References Cited

U.S. PATENT DOCUMENTS 9,178,816 B1 *   11/2015   Ojha .................. H04L 45/74
9,276,871 B1 *    3/2016   Freitas ............... H04L 61/2007
(Continued)

OTHER PUBLICATIONS

Bouet Mathieu et al: "Distributed SON for Mission-Critical Networks", 2014 IEEE Military Communications Conference, IEEE, Oct. 6, 2014 (Oct. 6, 2014), pp. 942-948, XP032686445, DOI: 10.1109/MILCOM.2014.162.*

(Continued)

Primary Examiner — Aftab N. Khan
(74) Attorney, Agent, or Firm — Patterson + Sheridan, LLP (57) ABSTRACT

Methods and apparatus for optimizing data center routing in the event of virtual machine (VM) mobility are provided. In one embodiment, a first gateway router, acting as an interface between an Ethernet Virtual Private Network (EVPN) domain and a Locator/ID Separation Protocol (LISP) domain, detects EVPN mobility messages advertised when a VM that has moved connects to a gateway router at a data center. The first gateway router then initiates a LISP mobility event that registers the new location of the moved VM to a LISP mapping system. In another embodiment, the first gateway router may notify a second gateway router, located at another data center from which the VM departed, to clean up the state maintained in that data center. This notification may be made via EVPN or LISP mechanisms. In response, the second gateway router may insert a new sequence into the other data center.

14 Claims, 4 Drawing Sheets

(51) Int. Cl.
*H04L 12/723* (2013.01)
*G06F 9/50* (2006.01)
*G06F 21/53* (2013.01)
*H04L 12/46* (2006.01)
*H04L 12/713* (2013.01)
*H04L 12/715* (2013.01)
*H04L 29/08* (2006.01)
*H04L 12/721* (2013.01)
*H04L 12/931* (2013.01)

(52) U.S. Cl.
CPC ............... *G06F 2009/4557* (2013.01); *G06F 2009/45595* (2013.01); *H04L 49/70* (2013.01)

(56) References Cited

U.S. PATENT DOCUMENTS

| | | | |
|---|---|---|---|
| 9,438,531 B2* | 9/2016 | Freitas | H04L 61/2007 |
| 9,497,039 B2* | 11/2016 | Greenberg | H04L 12/4633 |
| 2011/0142053 A1* | 6/2011 | Van Der Merwe | H04L 47/72 370/395.1 |
| 2012/0054367 A1* | 3/2012 | Ramakrishnan | G06F 9/4856 709/242 |
| 2013/0198355 A1* | 8/2013 | Kalyanaraman | H04L 67/34 709/223 |
| 2013/0238802 A1* | 9/2013 | Sarikaya | H04L 29/08153 709/226 |
| 2014/0007089 A1* | 1/2014 | Bosch | G06F 9/5077 718/1 |
| 2014/0177640 A1* | 6/2014 | Yang | H04L 45/586 370/401 |
| 2014/0321459 A1* | 10/2014 | Kumar | H04L 47/2425 370/360 |
| 2016/0173338 A1* | 6/2016 | Wolting | H04L 41/145 709/223 |
| 2016/0188359 A1* | 6/2016 | Chang | H04L 12/6418 718/1 |
| 2016/0226818 A1* | 8/2016 | Kamath | H04L 29/08576 |
| 2016/0248702 A1* | 8/2016 | Banavalikar | H04L 45/72 |
| 2016/0261579 A1* | 9/2016 | Janakiraman | H04L 63/101 |

OTHER PUBLICATIONS

Sajassi A et al: "BGP MPLS Based Ethernet VPN; draft-ietf-12vpnevpn-11 . txt", BGP MPLS based ethernet VPN; Draft-IETF-L2VPNEVPN-11.TXT, Internet Engineering Task Force, IETF; Standardworkingdraft, Internet Society (ISOC) 4, Rue des Falaises CH—1205 Geneva, Switzerland, Oct. 17, 2014 (Oct. 17, 2014), pp. 1-52, XP015102232.*

F Maino Cisco System: A Unified LISP Mapping Database for L2 and L3 Network Virtualization Overlays; A Unified LISP Mapping Database for L2 and L3 Network Virtualization Overlays; Draft-Hertoghs-NV03-Lispcontrolplane-Unified-02.Txt, Internet Engineering Task Force Ietf; (ISOC) 4, Jul. 21, 2014, p. 1-24, XP015100759.*

"Cisco Dynamic Fabric Automation Technology: Overview and Deployment Considerations What You Will Learn Function Platform 1/0 Module Minimum Software Version", May 20, 2014, pp. 1-23, XP055203846, Retrieved from the Internet: URL:http://www.cisco.com/c/en/us/solutions/collateral/data-centervirtualization/unified-fabric/white-paper-c11-731098.pdf.*

* cited by examiner

DATA CENTER INBOUND ROUTING OPTIMIZATION IN THE EVENT OF VIRTUAL MACHINE MOBILITY

TECHNICAL FIELD

Embodiments of the present disclosure generally relate to network communication and, more particularly, to data center inbound routing optimization following movement of a virtual machine.

BACKGROUND

In a Multiprotocol Label Switching (MPLS) Ethernet virtual private network (EVPN), data centers are interconnected by means of an MPLS provider core network. Each data center may include devices that use the Multiprotocol-Border Gateway Protocol (MP-BGP) to dynamically communicate with each other.

BGP MPLS based EVPN is capable of supporting virtual machine (VM) mobility across data centers. As VMs move across data centers, traffic should be routed to those VMs along optimal paths, rather than taking sub-optimal detours. One technique for routing optimization involves injecting host routes of moved VMs into the wide area network (WAN) BGP to prevent traffic tromboning, in which the traffic flows first to the original data center from which the VM departed and only then to the new data center at which the VM landed. Injecting such host-level information into the WAN can result in a number of problems. For example, scalability issues arise as the number of moved VMs increases, which causes more information to be injected into the WAN, as well as an explosion of states in the data centers as the set of host route information maintained in the data centers increases. In addition, third party networks between the data centers may refuse to accept such a fine level of granularity in the host routes. That is, third party networks between the data centers may not accept routes smaller than a certain size, which would rule out such host routes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Overview

Embodiments presented herein generally relate to optimizing inbound routing of network traffic in the event of virtual machine (VM) mobility. One embodiment presented herein includes a method for optimizing network routing. The method generally includes receiving, by a first network device, an Ethernet virtual private network (EVPN) mobility event advertisement indicating a virtual machine (VM) moved from a first data center to a second data center. The method further includes, in response to receiving the advertisement: registering a current location of the moved VM in a Locator/ID Separation Protocol (LISP) mapping system, and notifying a second network device in the first data center of the mobility event.

Another embodiment presented herein provides an apparatus, located in a first data center and configured to optimize routing. The apparatus generally includes at least one processing unit. The at least one processing unit is typically configured to receive an EVPN mobility event advertisement indicating a VM moved from a second data center to the first data center. The at least one processing unit is further configured to, in response to receiving the advertisement: register a current location of the moved VM in a LISP mapping system, and notify a network device in the second data center of the mobility event.

Yet another embodiment presented herein provides an apparatus, located in a first data center and configured to optimize routing. The apparatus generally includes means for receiving an EVPN mobility event advertisement indicating a VM moved from a second data center to the first data center. The apparatus further includes means for, in response to receiving the advertisement: registering a current location of the moved VM in a LISP mapping system, and notifying a network device in the second data center of the mobility event.

Example Embodiments

Embodiments described herein provide data center routing optimization in the event of virtual machine (VM) mobility. In one embodiment, a first gateway router, acting as an interface between an Ethernet Virtual Private Network (EVPN) domain and a Locator/ID Separation Protocol (LISP) domain, detects a EVPN mobility message advertised when a VM that has moved connects to a network device at the data center. LISP is a technology for network virtualization used to deploy Internet based virtual private networks (VPNS), and LISP provides on-demand tunneling for traffic exchanges across VPN sites and the data center. In response to detecting the EVPN mobility message, the first gateway router initiates a LISP mobility event that registers the new location (i.e., an address of network infrastructure) of the moved VM to a LISP mapping system. The LISP mapping system maintains a database outside of the wide area network (WAN) used to handle endpoint reachability information without polluting routing protocols in the WAN itself. Traffic can then be tunneled to the appropriate data center based on information obtained from the LISP mapping system.

In addition to registering the new location with the LISP mapping system, the first gateway router may notify a second gateway router, located at another data center from which the VM departed. In response, the second gateway router cleans up state information maintained in the second gateway router and other network devices in the other data center. The notification may be made via EVPN or LISP mechanisms. Cleaning up state data may include the second gateway router inserting an improved sequence number into the other data center to trigger route withdrawal. After route withdrawal, the second gateway router may still receive traffic flows to the VM that has moved and, in such cases, the second gateway router will notify the sender of the traffic to retrieve a mapping for the moved VM from the LISP mapping system. Using the new mapping, the sender may redirect traffic to the data center at which the VM is now located, eliminating the sub-optimal detour through the data center from which the VM departed.

Figure 1:
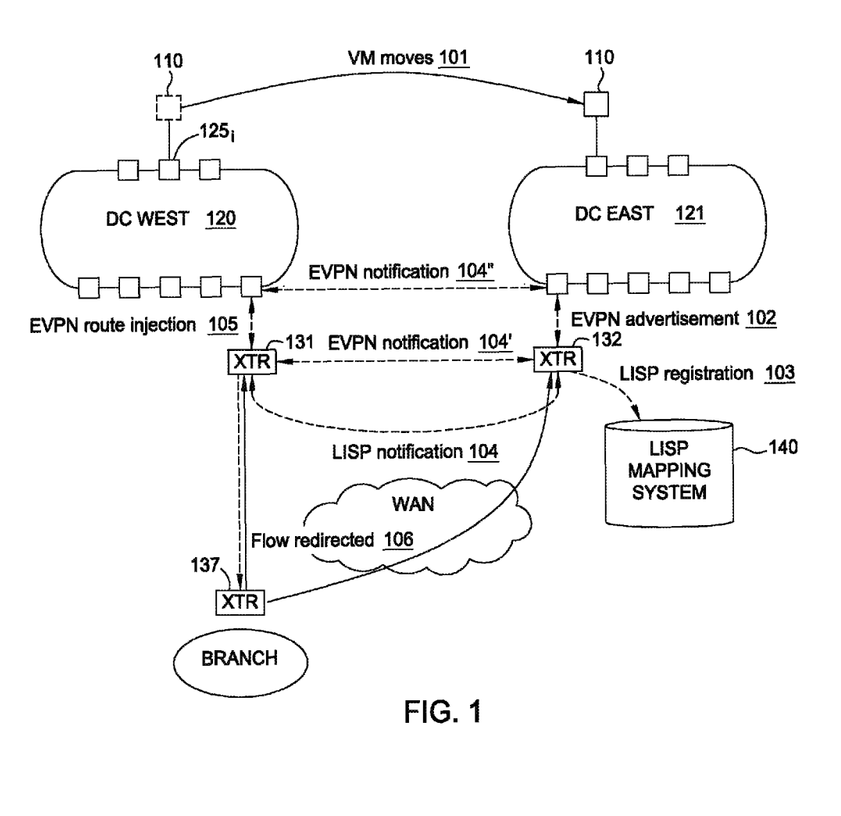
FIG. 1 illustrates an approach for optimizing inbound routing in the event of VM mobility, according to an embodiment.

FIG. 1 illustrates an approach for optimizing inbound routing in the event of VM mobility without injecting host routes into the wide area network, according to an embodiment. As shown, at 101, a VM 110 moves from a first physical data center ("Data Center West 120") to a second physical data center ("Data Center East 121") and connects to a network device $125_i$ at Data Center East 121. Commercially available software exists for moving VMs, including across data centers. Illustratively, each of the data centers 120-121 has Ethernet virtual private network (EVPN) running therein and is a separate Border Gateway Protocol (BGP) domain. More specifically, the EVPN within a data center may be a BGP session using an EVPN address family that runs amongst nodes (e.g., top-of-rack switches and border leaves) in the data center to inform each other of the state within the network fabric in the data center. Alternatively, one of the data centers 120-121 may be EVPN-based and the other may be LISP-based.

At 102, the connection of the VM 110 to the network device $125_i$ is detected by the network device $125_i$, which then determines whether the VM 110 has moved using EVPN mechanisms. In particular, the network device $125_i$ may determine if a route or sequence number for the VM already exists in its routing table, in which case the network device $125_i$ may assume that the VM was previously elsewhere and has just moved to Date Center East 121. If the network device $125_i$ determines that the VM 110 has moved, then the network device $125_i$ advertises the move with an improved sequence number. This EVPN advertisement message propagates across the network fabric. In response to receiving the message, network devices in Data Center East 121 reconverge their tables to indicate the new route by which the VM 110 is reachable and the improved sequence number.

At 103, a gateway router ("xTR") 132 at the edge of the network receives the EVPN advertisement message. Although shown as an edge device separate from network devices in the data center, the gateway router 132 may instead be one of the network devices, such as a border leaf node. The gateway router 132 is a LISP-enabled device, capable of encapsulating and decapsulating LISP packets, that acts as an interface between the EVPN domain and a LISP domain.

In response to receiving the EVPN advertisement message, the gateway router 132 may determine that its routing table does not contain a local route for the VM, thereby indicating that this is a moved VM and triggering LISP mobility mechanisms. The LISP mobility mechanisms include the gateway router 132 registering, in a LISP mapping system 140, that VM 110 is now reachable via the gateway router 132. Such registration may involve sending a Map-Register message to the LISP mapping system 140. The LISP mapping system 140 includes a database, maintained on a router or any device reachable over the network, and the database contains mappings of endpoint identifier (EID) addresses identifying endpoints to route locator (RLOC) addresses identifying locations, thereby splitting the identity and location of VMs into different numbering spaces. EIDs addresses may include IP addresses and prefixes identifying the end-points (e.g., VMs), and EID reachability may be achieved by resolving EID-to-RLOC mappings, typically by sending a LISP Map-Request query to a map resolver device. RLOC addresses may include IP addresses and prefixes identifying different routers in the IP network, and reachability within the RLOC space may be achieved by traditional routing methods. Note, the LISP mapping system 140 is abstracted from the wide area network (WAN) and, as a result, the host route information is in the WAN but not instantiated in WAN routing protocols that are currently topology bound.

In some embodiments, the gateway router 132 may also transmit a message back to a gateway router 131 at Data Center West 120 notifying the gateway router 131 of the VM's move. This notification is also referred to herein as "mobility signaling." Similar to gateway router 132, gateway router 131 is shown as an edge device separate from network devices in the Data Center West 120, but the gateway router 131 may instead be one of the network devices, such as a border leaf node. The mobility notification transmitted from gateway router 132 to the gateway router 131 may be a LISP mobility notification, shown in FIG. 1 as 104, or an EVPN notification, shown as 104'. In the case of the LISP mobility notification in particular, the EVPN mobility semantics from the EVPN advertisement may be relayed into the LISP mobility signaling mechanism, namely the Map-Notify message that is propagated back to the departure site Data Center West 120. For example, the LISP mobility notification may be extended to relay EVPN route attribute metadata such as sequence number and metadata such as ClassID. ClassID is a form of metadata in EVPN that creates grouping information for the VM.

In another embodiment, a notification may be transmitted by the network device $125_i$ itself using EVPN mechanisms, shown as 104", and the gateway router 132 may not participate in this process. In particular, an EVPN protocol session may be run between border leaves of Data Center West 120 and Data Center East 121 to interconnect the data centers. Such an EVPN session may accomplish VM mobility signaling by advertising BGP (host) routes with EVPN Network Layer Reachability Information (NLRIs) including BGP community attributes that contain the mobility sequence number and ClassID.

In yet another embodiment, shown as 104', the gateway router 132 is interposed in the EVPN session and forwards the EVPN session to the gateway router 131.

In response to receiving either the EVPN or LISP mobility notification, the gateway router 131 removes local routing information in its own routing table, and further inserts the route having the improved sequence number into the Data Center West 120 network at 105. Such an insertion triggers route withdrawal, in which network devices in Data Center West 120 reconverge their tables to indicate the new route by which the VM 110 is reachable and the improved sequence number.

At 106, the gateway router 131 receives traffic to the VM 110 from a router 133 at a branch location. In response, the gateway router 131 determines that the VM 110 is not at Data Center West 120 and sends a notification back to the router 133 instructing the router 133 to request a mapping of EID addresses to route locator addresses for the moved VM 110 from the LISP mapping system 140. By making such a request, the router 133 may resolve the new EID-to-RLOC mapping, update its cache to indicate that VM 110 is now reachable via the gateway router 132, and redirect traffic flows to Data Center East 121. That is, the router 133 is notified by the LISP infrastructure of the VM move and tunnels traffic flows to Data Center East 121 where the VM has moved.

Figure 2:
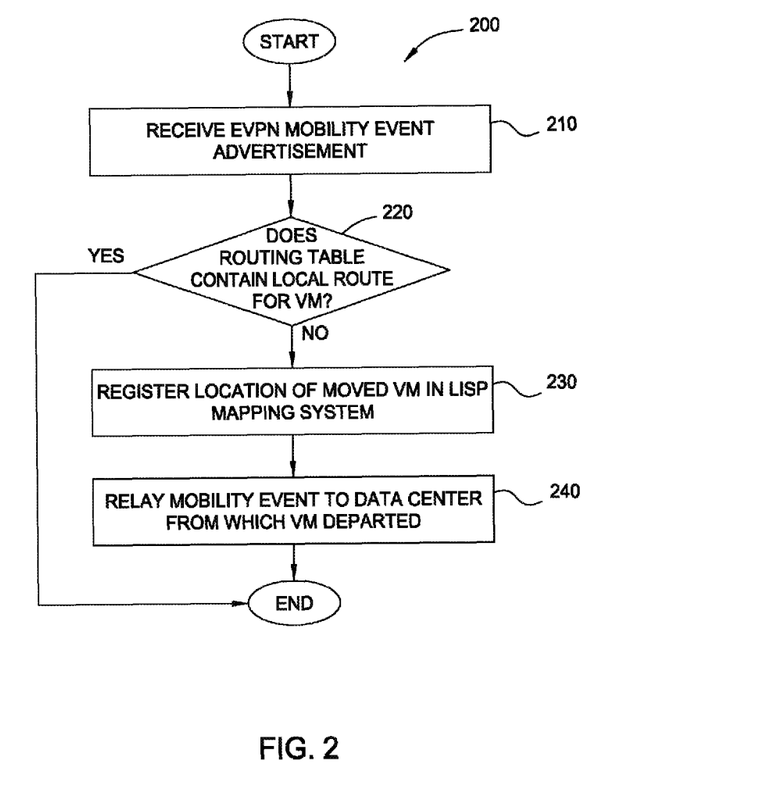
FIG. 2 illustrates a method for registering the location of a moved VM in a LISP mapping system and relaying the mobility event, according to an embodiment.

FIG. 2 illustrates a method 200 performed by a gateway router at the data center where a VM lands to register the location of a moved VM in a LISP mapping system and relay the mobility event back to the data center from which the VM departed, according to an embodiment. As shown, the method 200 begins at step 210, where the gateway router receives an EVPN mobility event advertisement. As discussed, when a VM moves across data centers and attaches to a network device at the landing site, that network device may detect the VM and advertise an improved sequence for the route by which the VM is now reachable. In particular, the network device may determine whether its routing table already includes a route for the moved VM, and if the routing table includes such a route, identified by its sequence number, then the network device assumes that the VM has moved and advertises an improved sequence number corresponding to the new route by which the VM is now reachable. Such an advertised message propagates across the network fabric and eventually reaches the edges of the data center, at which the gateway router is located.

In response to receiving the EVPN mobility event advertisement, the gateway router determines whether its own routing table includes a local route for the VM at step 220. That is, the gateway router determines whether the routing table includes a route that points to the data center in which the gateway router is located. Not having such a route, or having a 0 route installed, may indicate that the VM is away, i.e., not at the data center. The gateway router may thus determine if a VM has just moved to the data center based on whether there is a local route in the routing table for the VM or if there is instead no such route or a 0 route.

If the gateway router determines that its routing table does not include a local route for the VM, then at step 230, the gateway router registers the new location of the moved VM in a LISP mapping system. As discussed, such registration may involve sending a Map-Register message to the LISP mapping system, which is abstracted from the wide area network (WAN) so that host route information is in the WAN but not instantiated in routing protocols that are topology bound. The LISP mapping system maintains EID-to-RLOC mappings. When a gateway router receives traffic to a particular VM, the gateway router may query the LISP mapping system to resolve the EID-to-RLOC mapping for that VM and route traffic to the gateway router indicated by such a mapping. Accordingly, when a VM moves and the gateway router at the data center's edge receives the EVPN mobility advertisement message, the gateway router may register the new location of the moved VM to the LISP mapping system. Doing so permits other routers routing packets to the moved VM to query the LISP mapping system, resolve the latest mapping, and redirect traffic according to the mapping.

At step 240, the gateway router relays the mobility event back to the data center from which the VM departed. As discussed, either EVPN or LISP mechanisms may be used to relay the mobility event. In one embodiment, corresponding to 104' in FIG. 1, the gateway router may simply forward the EVPN session to a remote gateway router in the data center from which the VM departed. That is, the gateway router relays an EVPN signal in this embodiment.

In another embodiment, corresponding to 104 in FIG. 1, the mobility event may be relayed using LISP mechanisms. In such a case, the gateway router may receive the EVPN mobility event advertisement and this EVPN session may then trigger a LISP mobility event notification, namely a Map-Notify message. In particular, the gateway router may receive the EVPN advertisement of the improved sequence, discussed above, and check its routing tables to determine whether the improved sequence is a new host route or the VM is currently listed as remote. As the mobility signaling is relayed into LISP, the EVPN domain does not need to be stretched across data centers. In a particular embodiment, the LISP mobility notification may be extended to relay EVPN route attribute metadata such as sequence number and metadata associated with the VM such as ClassID, between domains without the need for an intermediate BGP EVPN. In another embodiment, the EVPN event may trigger a Map-Register, which in turn will be received at the map-server where a Map Notify is triggered, with both the map-register and map-notify containing the EVPN route attribute metadata.

In yet another embodiment, corresponding to 104" in FIG. 1, the gateway router may not relay mobility signaling at all. Rather, ordinary EVPN mechanisms may be used to relay mobility signaling, without the gateway router's participation. For example, an EVPN protocol session may be run between border leaves of two data centers to interconnect the data centers. Such an EVPN session may accomplish VM mobility signaling by advertising BGP (host) routes with EVPN-NLRIs including BGP community attributes that contain the mobility sequence number and ClassID.

Figure 3:
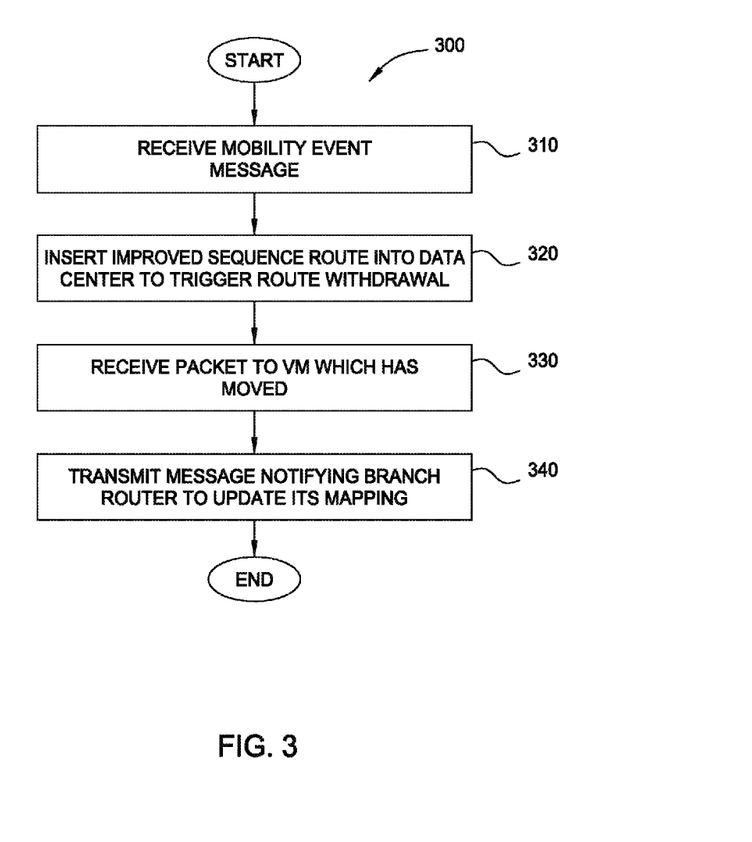
FIG. 3 illustrates a method for inserting an improved sequence in response to receiving a mobility event message and notifying a branch router to update its mapping, according to an embodiment.

FIG. 3 illustrates a method 300 performed by a gateway router at the data center from which a VM departs to insert an improved sequence in response to receiving a mobility event message and notify a branch router to update its mapping, according to an embodiment. As shown, the method 300 begins at step 310, where the gateway router at the data center receives a mobility event message. As discussed, mobility signaling may be relayed using EVPN or LISP mechanisms to the gateway router at the data center from which the VM departed.

At step 320, the gateway router at the data center from which the VM departed inserts into that data center the improved sequence in the mobility event message. In one embodiment, the gateway router may check its routing table to determine whether a local route already exists for the VM in the routing table. If a local route already exists, which would be the case for a VM that has moved, then the gateway router inserts the improved sequence into the data center. In addition, the gateway router may remove the local route or insert a 0 route in its own routing table, indicating that the VM is now away. Doing so helps minimize the state maintained on the gateway router.

Insertion of the improved sequence into the data center triggers route withdrawal in the data center. As discussed, route withdrawal is a BGP mechanism for updating the state in the routing domain so that old/expired information/state can be removed. In addition, any network device currently advertising a route with a previous sequence number will stop advertising that route. There would then not be a route in the data center for the departed VM, or the route for the departed VM may be a default route that indicates that packets to the VM should be routed to the gateway router.

At step 330, the gateway router receives, from a branch location router, a packet to the VM which has moved. In response, the gateway router transmits a message notifying the branch router to update its mapping at step 340. The gateway router knows to transmit this message, as there is no local route or a 0 route in its routing table, indicating that the VM is not at the data center. After receiving the message, the branch router may then query the LISP mapping system to resolve the latest EID-to-RLOC mapping for the moved VM. Thereafter, the branch location router may tunnel traffic flows to the VM according to the mapping.

Figure 4:
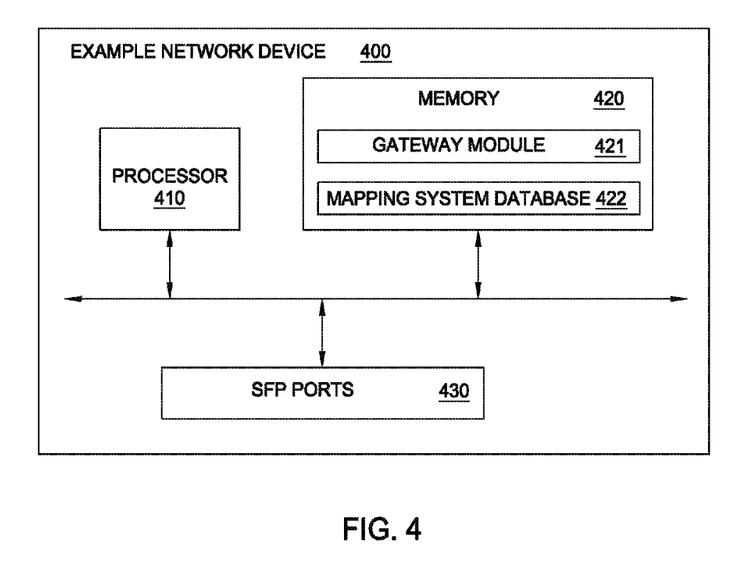
FIG. 4 illustrates an exemplary network device, according to an embodiment.

FIG. 4 illustrates an exemplary network device, according to an embodiment. The exemplary network device 400 may be a gateway router in one embodiment. Here, "router" is generally used to refer to devices that forward packets based on network and higher layer information, according to the Open Systems Interconnection (OSI) model. In other embodiments, the network device 400 may also be a switch, gateway, or other network device. In a particular embodiment, the network device 400 may be a specially configured router such as those available from Cisco Systems, Inc. of San Jose, Calif.

As shown, the network device 420 includes a processor 410, a memory 420, small form-factor pluggable (SFP) ports 430 (e.g., Ethernet ports), and a bus (e.g., a PCI bus). The components of the network device 400 are provided for explanatory purposes. A person skilled in the art can configure the network device 400 in many other ways. When acting under the control of appropriate software or firmware, the processor 420 is responsible for such router tasks as routing table computations, network management, and general processing of packets. The processor 420 typically accomplishes all of these functions under the control of software including, e.g., an operating system and any appropriate applications software stored in the memory 420.

Illustratively, the memory 420 includes a gateway module 421 and a mapping system database 422. The gateway module 421 is configured to receive an EVPN advertisement of a VM mobility event, determine whether there is a local route installed for the VM, and, if not, register the route of the VM to the mapping system database 422. In some embodiments, the gateway module 421 may further send an EVPN or LISP mobility notification back to the data center from which the VM departed. Conversely, the gateway module 421 may receives such an EVPN or LISP notification from another router, the gateway module 421 may respond by removing the local route in its routing table (or making it a 0 route) and inserting an improved sequence number into the data center, thereby triggering route withdrawal within that data center.

The mapping system database 422 is configured to maintain EID-to-RLOC mappings for VMs. As discussed, EIDs can be at different RLOCs based on the EID-RLOC mappings, depending on where an EID attaches to the network. In contrast, RLOCs are associated with the topology and are reachable by traditional routing. EID-to-RLOC mappings may be resolved using entries stored in the mapping system database 422 so that routing is redirected for inbound optimization when VMs move across data centers. Note, not every network device 420 may have the mapping system database 422 process, although least one instance of the mapping system database 422 should be present/reachable in some device in the network. Network devices which do not have the mapping system database 422 may instead include a mapping cache (not shown) which caches EID-to-RLOC mappings retrieved from the mapping system database 422.

Advantageously, techniques disclosed herein provide an interface between the EVPN mobility database and the LISP mobility infrastructure that enables scalable data center inbound traffic optimization in the event of VM mobility, preventing the need to inject host routes into the BGP WAN. EVPN and LISP may be used where they are most effective. Within data centers, EVPN may be used, as having complete states is preferable, and routers may wait for routers may wait for full convergence of EVPN so as to avoid losing even a single packet. Across data centers, economy in terms of the number of states maintained in border gateways is preferable, and LISP may be used to achieve this. In addition, techniques disclosed herein relay mobility signaling into LISP so that BGP/EVPN community attribute information may be relayed between domains without the need for an intermediate BGP/EVPN domain between data centers.

While the foregoing is directed to embodiments of the present invention, other and further embodiments of the invention may be devised without departing from the basic scope thereof, and the scope thereof is determined by the claims that follow.

The invention claimed is:

1. A computer-implemented method, comprising:
   receiving, by a first network device in a first data center, an Ethernet virtual private network (EVPN) mobility event advertisement subsequent to a virtual machine (VM) moving from a second data center to the first data center; and
   in response to receiving the EVPN mobility event advertisement and determining that a local route has not been installed for the VM in a routing table of the first network device:
      registering, by the first network device, a current location of the VM in a Locator/ID Separation Protocol (LISP) mapping system, and
      notifying, by either the first network device or another network device in the first data center, a second network device in the second data center of the VM move,
   wherein the second network device is notified via a mobility notification that includes (a) EVPN route attribute metadata including a sequence number, and (b) metadata associated with the VM including a ClassID providing grouping information for the VM,
   wherein the first network device is a border leaf node or edge device of a first network in the first data center and the second network device is a border leaf node or edge device of a second network in the second data center, and
   wherein, after receiving the notification of the VM move, the second network device transmits, to each router attempting to route one or more packets to the VM via the second network device, a respective message to retrieve a mapping for the VM from the LISP mapping system to update a mapping maintained by the router.

2. The method of claim 1, wherein, after receiving the notification of the mobility event, the second network device further inserts, into the second data center, an improved sequence number to trigger route withdrawal.

3. The method of claim 1, wherein the second network device is notified via an EVPN mobility notification.

4. The method of claim 1, wherein the second network device is notified via a LISP mobility notification extended to relay the EVPN route attribute metadata and the metadata associated with the VM.

5. The method of claim 1, wherein the first data center includes an EVPN domain and the second data center includes a LISP domain.

6. An apparatus, located in a first data center, the apparatus comprising:
   at least one processing unit configured to optimize inbound routing by performing steps comprising:
      receiving an Ethernet virtual private network (EVPN) mobility event advertisement subsequent to a virtual machine (VM) moving from a second data center to the first data center; and in response to receiving the EVPN mobility event advertisement and determining that a local route has not been installed for the VM in a routing table of the apparatus:
    registering a current location of the VM in a Locator/ID Separation Protocol (LISP) mapping system, and
    notifying a network device in the second data center of the VM move,
wherein the network device is notified via a mobility notification that includes (a) EVPN route attribute metadata including a sequence number, and (b) metadata associated with the VM including a ClassID providing grouping information for the VM,
wherein the apparatus is a border leaf node or edge device of a first network in the first data center and the network device is a border leaf node or edge device of a second network in the second data center, and
wherein, after receiving the notification of the VM move, the network device transmits, to each router attempting to route one or more packets to the VM via the network device, a respective message to retrieve a mapping for the VM from the LISP mapping system to update a mapping maintained by the router.

7. The apparatus of claim 6, wherein, after receiving the notification of the mobility event, the network device further inserts, into the second data center, an improved sequence number to trigger route withdrawal.

8. The apparatus of claim 6, wherein the network device is notified via an EVPN mobility notification.

9. The apparatus of claim 6, wherein the network device is notified via a LISP mobility notification extended to relay the EVPN route attribute metadata and the metadata associated with the VM.

10. The apparatus of claim 6, wherein the second data center includes an EVPN domain and the first data center includes a LISP domain.

11. An apparatus, located in a first data center and configured to optimize inbound routing, the apparatus comprising:
    means for receiving an Ethernet virtual private network (EVPN) mobility event advertisement subsequent to a virtual machine (VM) moving from a second data center to the first data center; and
    means for, in response to receiving the EVPN mobility event advertisement and determining that a local route has not been installed for the VM in a routing table of the apparatus:
        registering a current location of the VM in a Locator/ID Separation Protocol (LISP) mapping system, and
        notifying a network device in the second data center of the VM move,
wherein the network device is notified via a mobility notification that includes (a) EVPN route attribute metadata including a sequence number, and (b) metadata associated with the VM including a ClassID providing grouping information for the VM,
wherein the apparatus is a border leaf node or edge device of a first network in the first data center and the network device is a border leaf node or edge device of a second network in the second data center, and
wherein, after receiving the notification of the VM move, the network device transmits, to each router attempting to route one or more packets to the VM via the network device, a respective message to retrieve a mapping for the VM from the LISP mapping system to update a mapping maintained by the router.

12. The apparatus of claim 11, wherein, after receiving the notification of the mobility event, the network device further inserts, into the second data center, an improved sequence number to trigger route withdrawal.

13. The apparatus of claim 11, wherein the network device is notified via an EVPN mobility notification.

14. The apparatus of claim 11, wherein the network device is notified via a LISP mobility notification extended to relay the EVPN route attribute metadata and the metadata associated with the VM.

\* \* \* \* \*